United States Patent [19]

Takashima

[11] Patent Number: 4,461,789

[45] Date of Patent: Jul. 24, 1984

[54] METHOD OF GUNNING BASIC GUNNING REFRACTORIES

[76] Inventor: Masaru Takashima, 4-12-15, Takanawa, Minato-ku, Tokyo, Japan

[21] Appl. No.: 479,945

[22] Filed: Mar. 29, 1983

[51] Int. Cl.$^3$ .............................................. B05D 1/02
[52] U.S. Cl. .................................. 427/426; 427/421; 427/427
[58] Field of Search .................... 427/426, 427, 421; 118/317

[56] References Cited

U.S. PATENT DOCUMENTS

| | | | |
|---|---|---|---|
| 2,495,540 | 1/1950 | Nichols et al. | 427/426 X |
| 3,797,745 | 3/1974 | Haus | 118/317 |
| 4,239,397 | 12/1980 | Sandell et al. | 427/426 X |

FOREIGN PATENT DOCUMENTS 896218  1/1982  U.S.S.R. ............................. 427/426

*Primary Examiner*—Shrive P. Beck

*Attorney, Agent, or Firm*—Maky, Renner, Otto & Boisselle

[57] ABSTRACT

A method of gunning a basic gunning refractory onto a hot or cold surface to provide a gunned coating or filling, by a nozzle mixing method, the gunning refractory containing a basic refractory as aggregate, not more than 5% by weight of at least one of organic fibrous materials and inorganic fibrous materials, and as a binder, at least one of phosphates and silicates, characterized in that the gunning refractory is fed to the nozzle under air pressure in the range of 1-10 Kg/cm$^2$, the gunning refractory is then discharged while being mixed at the nozzle with 5-25% by weight of water under pressure in the range of 0.5-5 Kg/cm$^2$ and while a rotary motion is imparted thereto, the gunning is commenced by first discharging air and water simultaneously and then the gunning refractory, and the distance between the nozzle discharge end and the surface is in the range of 0.15 to 1.00 m while the spray width is less than 1.00 m.

12 Claims, No Drawings

METHOD OF GUNNING BASIC GUNNING REFRACTORIES

This invention relates to a gunning method in which basic gunning refractories are applied as a coating or fill on a surface of a construction, vessel or apparatus requiring a refractory property.

These days unshaped refractories are becoming widely used due to their effectiveness for the improvement of working efficiency and there have been introduced various working methods utilizing vibration, centrifugal force, pressure force, injection, gunning, etc. as well as pouring, and feeding under pressure. However, in carrying out these working methods problems peculiar to each have arisen, and particularly for the gunning method there is room for improvement in obtaining an even adhesion layer with good yield, owing to rebound loss or droop.

In these circumstances the inventor of this invention has noticed that in gunning the basic refractories a dry gunning by nozzle mixing in which solid and liquid are mixed at the nozzle portion is superior in obtaining adhesion layers of excellent refractory and anti-corrosive properties, in cooperation with the adoption of basic refractories, to a wet gunning using refractory slurry, and as a result of having studied the adaptation of gunning refractories and gunning conditions he has been able to obtain an effective knowledge thereby to improve upon prior gunning methods irrespective of cold gunning or hot gunning and to make the present invention in which the present gunning method can be conveniently practiced.

According to the present invention it is possible to form a strong refractory layer at any place where refractory coating or filling is needed, irrespective of plane, curved surface, concave portion, void portion, and the inner surface or the outer surface of tubular body, not to speak of melting furnaces such as a blast furnace, converter, electric furnace and reverberatory furnace, vessels for molten metal such as a ladle and tundish, vessels for treating molten metals used in the Rheinetahl-Hereus process and Dortmund Hüttenunion process, various industrial heating furnaces, various accessories and accessory positions of all these furnaces and vessels, and appliances and apparatus used therewith. It is also possible to resolve the problem of rebound loss or droop.

The object of the invention is to provide a method for gunning a basic gunning refractory in which there is provided a cold or hot gunned coating or filling, by a nozzle mixing method, of a gunning refractory containing a basic refractory as aggregate, not more than 5% by weight of at least one of organic fibrous materials and inorganic fibrous materials, and as a binder, at least one of phosphates and silicates, characterized in that the gunning refractory is fed to a nozzle portion under air pressures in the range of 1–10 Kg/cm$^2$, said gunning refractory is then discharged while being mixed at said nozzle portion with 5–25% by weight of water under pressure in the range of 0.5–5 Kg/cm$^2$ and while being accompanied by a rotary motion, the gunning is commenced by first discharging airr and water simultaneously and then introducing the gunning refractory, and the distance between the nozzle discharge end and the gunning surface is in the range of 0.15 to 1.00 m while the gunning width is less than 1.00 m.

The reason for using basic refractories as aggregate of the gunning refractory in effecting the present invention is that not only they are excellent in both refractoriness and load softening point but particularly they exhibit an excellent melting-down resistancy against high temperature under the co-existence with basic slag, and as the basic refractories there can be used more than one selected from among magnesia refractories such as magnesia clinker, dolomite clinker, peridottite, chrome magnesia and magnesia spinel, and lime refractories such as sintered calcia, larnite and quick lime.

Organic and inorganic fibrous materials enhance the porosity of the gunned coating layer, have smaller bulk specific density and improve the spalling resistance of said coating layer so that at least one or both of them is mixed up to 5% by weight. Even with the addition thereof by more than 5% by weight any improved effect is not noticed but to the contrary it degrades the mechanical strength (compressive strength). As such fibrous materials the following can be mentioned.

That is, there can be used animal and vegetation fibers such as pulp, beaten paper, cotton, wool, silk and synthetic fibers, as organic fibrous materials, and heat resistant fibers such as asbestos, rock wool, slag wool, ceramic fibers and carbon fibers, as inorganic fibrous materials.

Phosphates and silicates used as binder are known as binder for refractory aggregate, and there can be used more than one selected from among alkali metal salts, alkali earth metal salts and aluminium salts of orthophosphotic acid, polyphosphoric acid, methaphosphoric acid and ultraphosphoric acid with regard to phosphates, and from among alkali metals of silicic acid with regard to silicates.

Further, it is possible to selectively add, to the gunning refractory, a carbonaceous material or inorganic or organic viscosity-increasing agent besides the above materials, as necessary.

The gunning refractory is fed to the nozzle portion under air pressures from 1 to 10 Kg/cm$^2$ and discharged while being mixed with water under pressures in the range of 0.5–5 Kg/cm$^2$ and while being accompanied by a rotary motion in said nozzle portion. The reason why the gunning refractory is fed under air pressures in the range 1 to 10 Kg/cm$^2$ is that it is possible to optionally take the mode of discharging ranging from gunning and beating to a condition like flowing-out, and with 1 Kg/cm$^2$ the air pressure is not sufficient while 10 Kg/cm$^2$ air pressure is too great whereby neither of the cases can achieve the object of the present invention. Preferably, to prevent the nozzle from blocking, the gunning order at the time of starting the discharge is brought in such a way that the air and the water are discharged simultaneously and then the gunning refractory is discharged.

One or more openings for supplying water in said nozzle portion can be provided in optional position and mode in the nozzle portion to effect a nozzle mixing. Preferably the amount of supplied water is from 5 to 25% by weight to the gunning refractory, less than 5% by weight of water being too little to make a complete mixing and to give sufficient adhesion strength while more than 25% by weight is too great so as to flow the gunning refractory away whereby neither of these cases forms a sufficient coating layer.

It is one of the important constitutional features of the invention to discharge said mixture with a rotary motion, and as a method of making the rotary motion it is effective, for example, to provide the opening for feeding the gunning refractory to the nozzle portion tangentially to the cross section of said nozzle, and it is also preferable to use a plate like guide plate along the rotational direction within the nozzle portion, either alone or in co-use with said opening. Further, it is effective, as an auxiliary means for imparting the rotary motion, to arrange the opening or openings for supplying water in the tangential direction along the rotational direction of said gunning refractory. In any case it is capable of optionally selecting the rotational direction of said gunning refractory in the designing process of nozzle.

With respect to nozzle operation it is preferable that the distance from the nozzle to the gunning surface is in the range of 0.15 to 1.00 m. With less than 0.15 m distance the gunning refractory is greatly lost by rebound while if the distance exceeds 1.00 m the discharging energy is lowered, so that either of such cases does not form a preferable coating layer. Furthermore, the reason why the gunning width of the gunning refractory at the gunning surface is less than 1.00 m is that it is related to said distance between the nozzle and the gunning surface, and in case the gunning width is more than 1.00 m it is no longer possible to obtain a useful coating layer. The adjustable range of more suitable gunning width is from 0.05 to 1.00 m.

Preferably the angle to the gunning surface of the nozzle may be as near right angle (vertical) as possible, but practically an angle of more than 45 degrees will suffice since it hardly causes rebound and it is almost the same as in right angle application. Said angle of the nozzle can be changed by turning the nozzle arm or curving or bending the tip portion of the nozzle. As the operating apparatus it will be proper to use an automatic operation apparatus provided with various functions such as travelling, moving sidewise and vertically and turning.

Referring to the temperature of the gunning surface, the preferable temperature range wherein the present invention can be effected is 0°–1,000° C. If it is below 0° C. the gunning freezes and if it exceeds 1,000° C. the water content quickly evaporates so that in both cases it becomes difficult to gun the refractory.

Preferably the discharge amount from the nozzle is in the range 5–25 Kg/min. With less than 5 Kg/min or more than 25 Kg/min the discharge amount respectively is too little or too much whereby in both these cases gunning becomes impossible.

The nozzle in relation to the gunning surface can move in optional direction accompanied by reciprocal movement and spiral movement. Naturally a reverse case may occur to the case in which the moving direction of said nozzle corresponds to the rotational movement direction of said gunning refractory, but in any case the object of the present invention is achievable. It is preferable that the moving speed of the nozzle in relation to the gunning surface is 30 m/min during the gunning, and to be speedier than 30 m/min is too fast so that the adhesion of the gunning refractory becomes incomplete due to the rebounding of the refractory from the gunning surface.

Whether to move the nozzle during the gunning by hand or automatically does not adversely affect the function and effect of the invention if the variety of the above conditions are satisfied, but from the safety point of view of working it would be better to use an automated machine.

Now referring to the nozzle employed in the method of this application, it would be preferable to provide at the peripheral edge of the tip thereof air injection ports which form an air curtain at the tip in the gunning direction, so as to prevent the gunning refractory from scattering. Further, to prevent the nozzle from blocking, it would also be preferable that gunning is carried out with a nozzle, at least part of which is provided with a rotational mechanism.

The following is an example in which the present invention was carried out for lining a surface of refractory bricks of a tundish for continuous steel casting.

A gunning was effected in such manner that a gunning refractory consisting of a mixture of 86% by weight of magnesia clinker, 4% by weight of rock wool, 3% by weight of waste cotton, 4% by weight of sodium primary phosphate and 3% by weight of sodium methasilicate, was fed to the nozzle portion under an air pressure of 5.3 Kg/cm$^2$ from the tangential direction to the cross section of the nozzle, while being supplied 11% by weight of water of the gunning refractory from the circumferential apertures in said nozzle portion. Maintaining the distance between the nozzle and the gunning surface at 0.4 m and the gunning angle at approximately 90° the nozzle was moved spirally along the inner circumference at the speed of 1 m/min. Moreover, the temperature at the gunning surface just before the starting of the gunning was 500° C., and a coating layer of 0.2 m adhesion width was obtained at a discharge amount of 15 Kg/min. Under such conditions the gunning refractory was discharged while being mixed with water and being accompanied by a rotary motion, the gunning refractory was adhered uniformly and smoothly to the gunning surface since being subject to a rectifying control by an intermediate squeezing portion, the rebound loss was only 10% though it was 30–40% according to conventional method, and droop was not noticed thereby improving upon conventional method.

An average thickness of 0.015 m was made to the coating layer of the tundish and the tundish was preheated at 1,000° C. for 30 minutes just before its operation, but cracking or any other phenomena occurred, the coating layer could stand the use of continuous-continuous castings of 5 charges of 200 ton steel melt, and the remaining minimum thickness of the coating layer was still 0.01 m at the finish of the casting so that a satisfiable result could be obtained.

What is claimed is:

1. A method of gunning a basic gunning refractory by which there is provided on a cold or hot gunning surface, by a nozzle mixing method, a gunned coating or filling of a gunning refractory containing a basic refractory as aggregate, not more than 5% by weight of each of at least one of organic fibrous materials and inorganic fibrous materials, and as a binder, at least one of phosphates and silicates, characterized in that the gunning refractory is fed to a nozzle portion under air pressure in the range of 1–10 Kg/cm$^2$, the gunning refractory is then discharged while being mixed at the nozzle portion with 5–25% by weight of water under pressure in the range of 0.5–5 Kg/cm$^2$ and while a rotary motion is imparted thereto, the gunning being commenced by first discharging air and water simultaneously and then with the gunning refractory, and the distance between the nozzle discharge end and the gunning surface is in the range of 0.15 to 1.00 m while the spray width is less than 1.00 m.

2. A method as described in claim 1 wherein the temperature of the gunning surface is in the range of 0°–1,000° C. for cold or hot gunning.

3. A method as described in claim 1 wherein the gunning refractory is imparted with a rotational motion in a predetermined, optional direction in the nozzle portion.

4. A method as described in claim 1 wherein the nozzle discharge rate is in the range of 5–25 Kg/min.

5. A method as described in claim 4 wherein the spray width is in the range of 0.05–1.00 m.

6. A method as described in claim 1 wherein the nozzle is moved in any optional one direction being accompanied by a reciprocating movement and a spiral movement.

7. A method as described in any one of claims 1, 4 and 5 wherein the travel speed of the nozzle is slower than 30 m/min.

8. A method as described in claim 7 wherein there is used a nozzle provided with air injection apertures which form an air curtain in the discharging direction.

9. A method as described in claim 8 wherein the gunning is carried out by rotating at least a part of the nozzle.

10. A method as described in claim 1 wherein the spray width is in the range of 0.05–1.00 m.

11. A method as described in claim 10 wherein the travel speed of the nozzle is slower than 30 m/min.

12. A method as described in any one of claims 1, 4 and 5 wherein there is used a nozzle provided with air injection apertures which form an air curtain in the discharging direction.

* * * * *